United States Patent
Hegde

(10) Patent No.: US 10,452,879 B2
(45) Date of Patent: Oct. 22, 2019

(54) MEMORY STRUCTURE FOR INVENTORY MANAGEMENT

(71) Applicant: Target Brands, Inc., Minneapolis, MN (US)

(72) Inventor: Prashanth Ganapathi Hegde, Anoka, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 15/928,841

(22) Filed: Mar. 22, 2018

(65) Prior Publication Data
US 2019/0294836 A1      Sep. 26, 2019

(51) Int. Cl.
*G06K 7/10*      (2006.01)
*H04L 9/06*      (2006.01)

(52) U.S. Cl.
CPC ........ *G06K 7/10386* (2013.01); *H04L 9/0643* (2013.01); *G06K 2007/10524* (2013.01)

(58) Field of Classification Search
USPC ........................................................ 235/451
See application file for complete search history.

(56) References Cited

U.S. PATENT DOCUMENTS

| 6,144,848 | A | 11/2000 | Walsh et al. |
| 7,568,629 | B2 | 8/2009 | Lapstun et al. |
| 7,800,499 | B2 | 9/2010 | Rehman |
| 8,717,165 | B2 | 5/2014 | Gernandt et al. |
| 8,781,927 | B2 | 7/2014 | Killian et al. |
| 9,780,435 | B2 | 10/2017 | McAllister |
| 2012/0075072 | A1 | 3/2012 | Pappu |
| 2012/0330769 | A1 | 12/2012 | Arceo |
| 2014/0229387 | A1* | 8/2014 | Chow ............... G06Q 20/3829 705/71 |
| 2015/0254677 | A1 | 9/2015 | Huxham et al. |
| 2015/0332570 | A1 | 11/2015 | Nelson et al. |
| 2015/0379860 | A1 | 12/2015 | Vardi |

FOREIGN PATENT DOCUMENTS

KR      20060053178 A      5/2006

OTHER PUBLICATIONS

Mahdin, An Approach for Removing Redundant Data from RFID Data Streams, Sensors, vol. 11, pp. 9863-9877, 2011.

* cited by examiner

*Primary Examiner* — Rafferty D Kelly
(74) *Attorney, Agent, or Firm* — Westman, Champlin & Koehler, P.A.; Theodore M. Magee

(57) ABSTRACT

A computer-implemented method includes receiving data comprising an RFID value transmitted by an RFID tag during a scanning task and an identifier for the scanning task. The RFID value and the identifier for the scanning task are combined to form a key and the key is applied to a hashing function to generate a memory index. The received data is stored at a memory location indicated by the memory index.

20 Claims, 8 Drawing Sheets

MEMORY STRUCTURE FOR INVENTORY MANAGEMENT

BACKGROUND

Store inventory management involves tracking the number of items located in various areas of a store. In large retail enterprises, inventory tracking must be performed across multiple stores and within various distribution centers. In general, inventory management involves periodic inventory counts during which actual numbers of product units are determined followed by periods of estimated counts where the number of units is estimated based on the initial values from an inventory count, the number of items sold, and the number of items shipped to or from a store or distribution center.

Performing inventory counts is a labor intensive endeavor that is prone to human error. In recent years, RFID technology has been used to reduce the amount of labor required for inventory counting. In RFID-based systems, individual product units are provided with RFID tags that generate a radio signal, which provides a unique RFID value associated with the tag. During an inventory count, an RFID scanner, either a fixed scanner or a mobile scanner, is used to collect RFID values of product units in areas of a store. The received RFID values are then converted into product descriptors, such as a product ID, product name, or product class. The RFID values that have a same product descriptor are then counted to arrive at the number of units of the product that are in the store.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving data comprising an RFID value transmitted by an RFID tag during a scanning task and an identifier for the scanning task. The RFID value and the identifier for the scanning task are combined to form a key and the key is applied to a hashing function to generate a memory index. The received data is stored at a memory location indicated by the memory index.

In accordance with a further embodiment, a system includes a plurality of scanning devices providing a plurality of RFID values during a plurality of scanning tasks. Each of a plurality of compute services implemented on a plurality of servers receive an RFID value from the plurality of RFID values and an identifier for a scanning task that produced the RFID value, combine the RFID value and the identifier for the scanning task to form a key, hash the key to form a memory index for a common memory used for all scanning tasks, and store the RFID value in the common memory at a location indicated by the memory index.

In accordance with a still further embodiment, a method includes accessing a memory location indexed by a hashed combination of an RFID value and a task identifier for a scanning task that provided the RFID value and using information stored in the accessed memory location to set a count of a number of units of a product scanned during the scanning task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
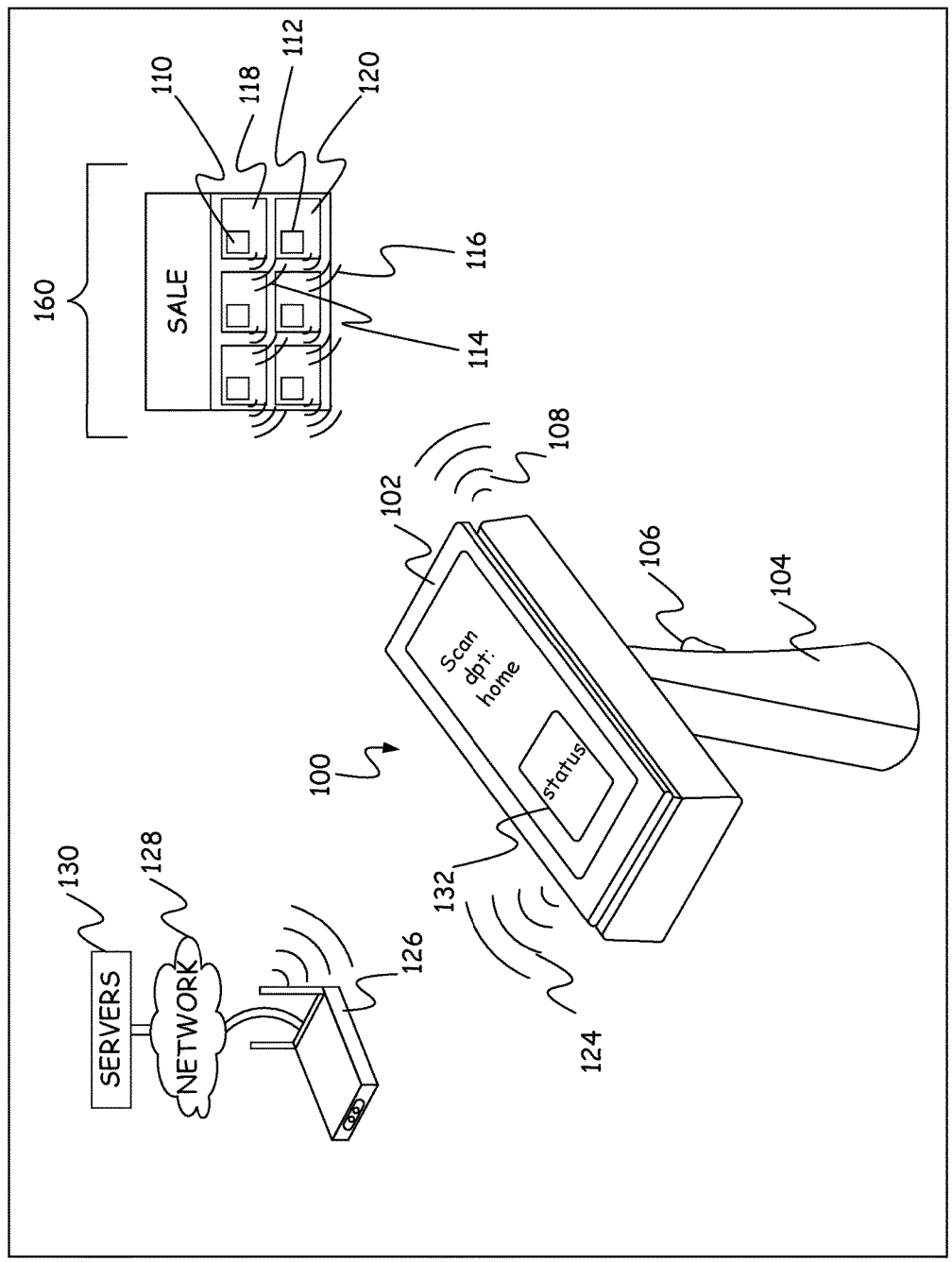
FIG. 1 is a plan view of a scanning system in accordance with one embodiment.

Computing systems have not been able to efficiently implement RFID-based inventory scanning. In particular, the computing systems have not provided for multiple scanning devices to be used at the same time to complete a scanning task without incurring inefficient database transactions. When using multiple scanning devices to perform a same scanning task, a same RFID tag may be read by two different devices. However, when this occurs for a single scanning task, the RFID value should not be counted twice. On the other hand, it is also possible for a product to be moved within a store between scanning tasks and to therefore by captured during two different scanning tasks. For instance, a product can be in a clothing department during a first scanning task and then be moved by a customer to a fitting room where it is captured in a second scanning task. Under those circumstances, it is desirable to track the movement of the product and therefore store the RFID value twice, once for each scan.

In the past, identifying when a scan is a duplicate scan of the same product unit in the same place versus when a scan is of the same product unit but in a different location in the store involves searching a database of scans for the RFID value, reading values from the database entry to determine information about the scan, and comparing that information to the current scan information to determine if the scan is a duplicate scan or a scan of the same product unit in a different area. In large scale retail systems containing millions of products, such database interactions result in a slow computing device.

Embodiments described below improve such computing devices by making it possible to quickly determine whether a scan of an RFID tag is a duplicate scan for a single scanning task or if the scan of the RFID tag is a first scan of the RFID tag for a particular scanning task. In accordance with one embodiment, this is achieved by combining the RFID value with a task identifier that represents the scanning task being performed. The scanning task identifier is associated with a scanning task for a particular area of a particular building with a start date and time when scanning begins. The combined RFID value and task identifier is used as a key to a hashing function to generate an index into a memory location. The RFID value and the task identifier are then stored at the memory location represented by that memory index. Since duplicate scans will have the same task ID, the same index will be hashed from the combination of the RFID tag value and the task identifier for any scanning device that scans the RFID tag while performing the same scanning task. However, when a scanning device is performing a different scanning task, a different task ID will be combined with the RFID tag value resulting in a different key and therefore a different memory index. As a result, when a product is moved to a different location in a store and is captured during a different scanning task, it will appear in a different memory location.

Using this system, the values in memory do not need to be read from memory and compared to a current scanning task in order to determine whether a scan is a duplicate or whether it is a separate scan of a product in a different area of a building or in a different building. This represents a marked improvement in computing devices.

FIG. 1 provides a plan view of a scanning system in accordance with one embodiment. In FIG. 1, a scanning device 100 consisting of a mobile device 102 and a RFID scanner 104 is shown. In FIG. 1, scanner 104 supports mobile device 102 and communicates with mobile device 102 over a wireless connection, such as a Bluetooth connection. Scanner 104 includes an activation trigger 106 that when activated causes scanner 104 to issue a radio frequency signal 108 that is detected by RFID tags located near scanner 104, such as tags 110 and 112. RFID tags 110 and 112 receive the radio frequency signal 108 and use the received signal as a power source to generate a response signal, such as response signals 114 and 116. Response signals of the RFID tags include at least one RFID value, which is unique to the product unit, such as product unit 118 for tag 110 and product unit 120 for tag 112. Response signals 114 and 116 are received by scanner 104 and are converted into digital RFID values. Scanner 104 transmits these RFID values to mobile device 102, which bundles multiple RFID values into a single message that is then transmitted through a wireless signal 124 to a wireless modem 126, which forwards the message through a network 128 to servers 130. In accordance with one embodiment, the message is transmitted using a Wi-Fi transmission protocol. Servers 130 process the message to determine a count of product units as described further below. Servers 130 are also able to send messages back to mobile device 102 through network 128 and wireless modem 126.

Figure 2:
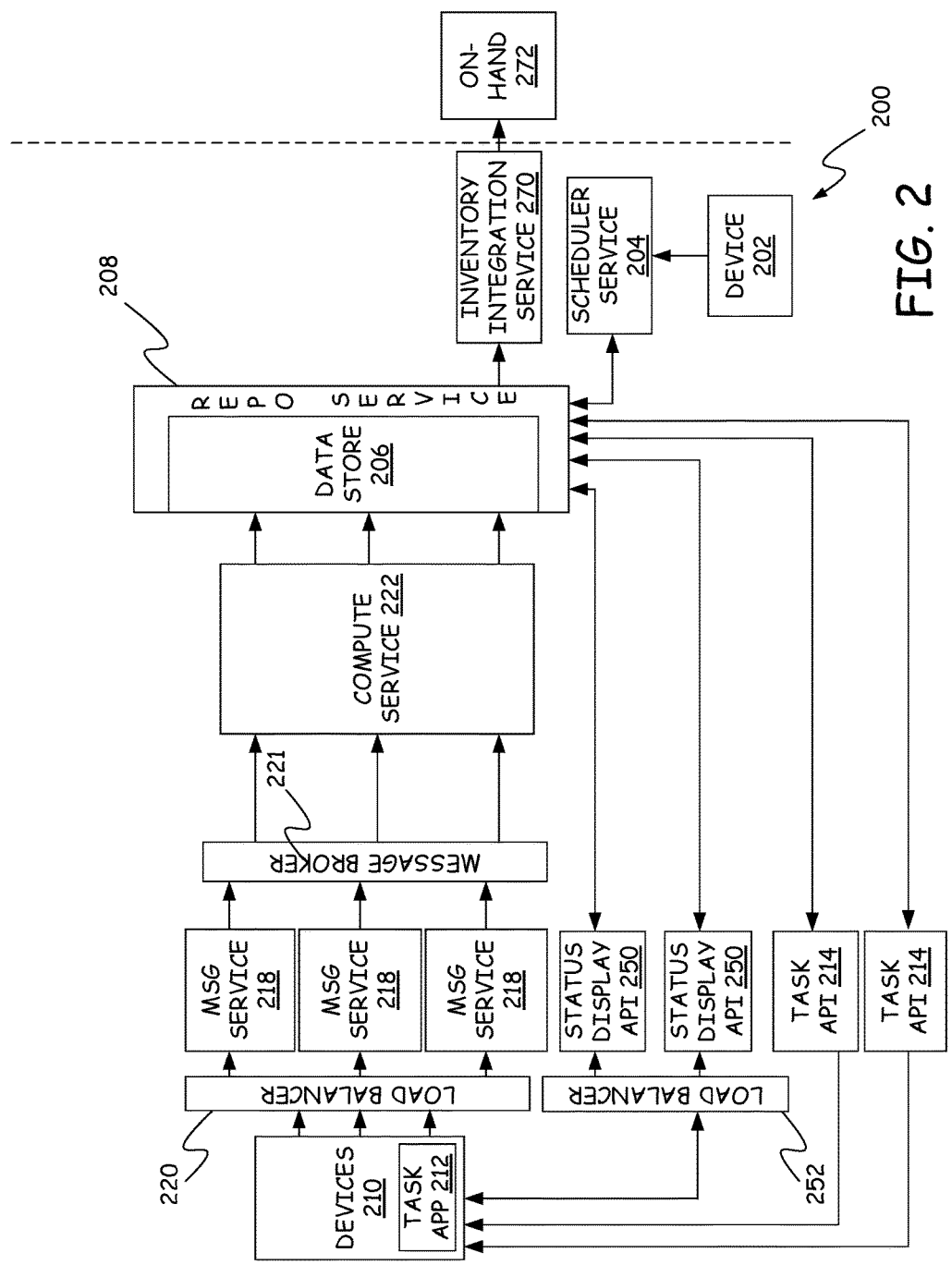
FIG. 2 is a block diagram of a computing system for obtaining RFID values, storing the RFID values, performing counts of scanned products and providing updates on the status of scan tasks.
Figure 3:
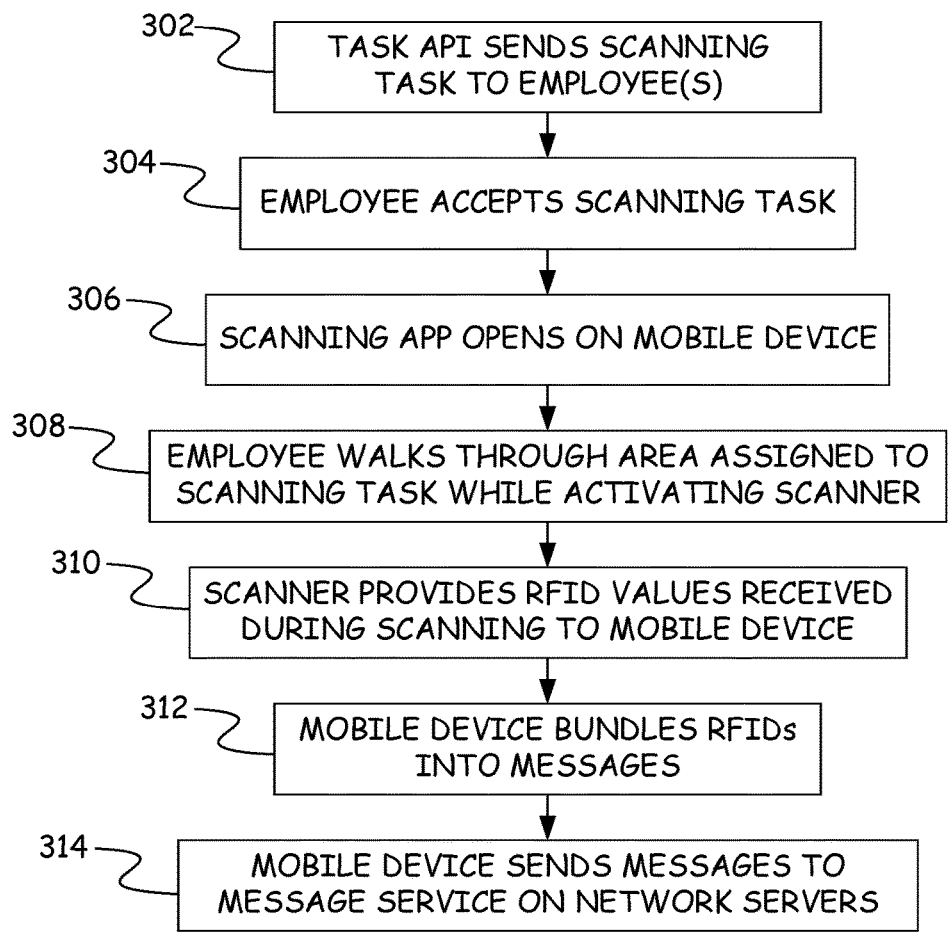
FIG. 3 is a flow diagram for performing a scan task.

FIG. 2 provides a block diagram of a system 200 for determining a count of products in a large retail enterprise and FIG. 3 provides a flow diagram of a method of scanning products in accordance with one embodiment.

In FIG. 2, a device 202 is used to access a scheduler service 204 to set scanning tasks for employees at multiple buildings in the retail enterprise including at stores and distribution centers. Each scheduled scanning task includes a building identifier, an area identifier within the building— such as a department —, a time and date when the task is to be presented to employees and a time and date when the task expires and should be removed from employees' lists of pending tasks if not completed. Scheduler service 204 stores each task in a data store 206 using one or more repository services 208.

Employees within the buildings carry devices 210, such as mobile device 102 of FIG. 1, which run various applications including a task application 212. In accordance with some embodiments, multiple devices 210 are distributed within each of multiple buildings across a retail enterprise.

Periodically, task application 212 calls task API 214, which operates on one or more servers, to request tasks that have been assigned to the employee logged into mobile device 210. Task API 214 then makes a request to repository services 208 for the assigned tasks that are currently scheduled for the employee. At step 302 of FIG. 3, task API 214 sends a scanning task to one or more employees through mobile device 210. At step 304, the employee accepts the scanning task using graphical user interfaces on mobile device 210, which in one embodiment takes the form of mobile device 102 of FIG. 1. The acceptance of the scanning task causes a scanning application to open on device 210 at step 306. At step 308, the employee walks through an area assigned to the scanning task while activating the scanner 104 using trigger 106 to collect RFID values from the scanning area 160 assigned to the scanning task. Scanner 104 provides the RFID values received from the RFID tags, such as tags 110 and 112, to the mobile device 102/210 at step 310. Mobile device 102/210 bundles the RFIDs into messages, by for example, placing one thousand RFID values in each message at step 312. In accordance with one embodiment, each message also includes a task ID associated with the scanning task that produced the message, an employee identifier of the employee who performed the scan and a scan time and date when the scan was performed. Thus, each RFID value in a message has a same task identifier. In addition, each message can optionally include a building identifier and area identifier within the building where the scan took place. At step 314, mobile device 102/210 sends messages to a message service 218 on servers 130.

In accordance with one embodiment, multiple devices in thousands of stores may be scanning at any one time. To avoid overloading a single instance of the message service 218, multiple instances of the message service 218 are run on multiple different servers and a message broker 220 distributes the scanning messages from device 210 among the different message services 218 to provide for efficient use of the various servers and to avoid message services that have failed and are no longer responding. In accordance with one embodiment, message services 218 receive data from separate scanning tasks in an interleaved manner over a period of time such that message service 218 will receive one or more messages for one scanning task in between receiving messages form another scanning task.

Message services 218 transfer the messages to a message broker 221, which stores the messages until the messages are requested by compute services 222. In accordance with one embodiment, message broker 221 and compute services 222 are implemented as distributed services across multiple servers.

Figure 5:
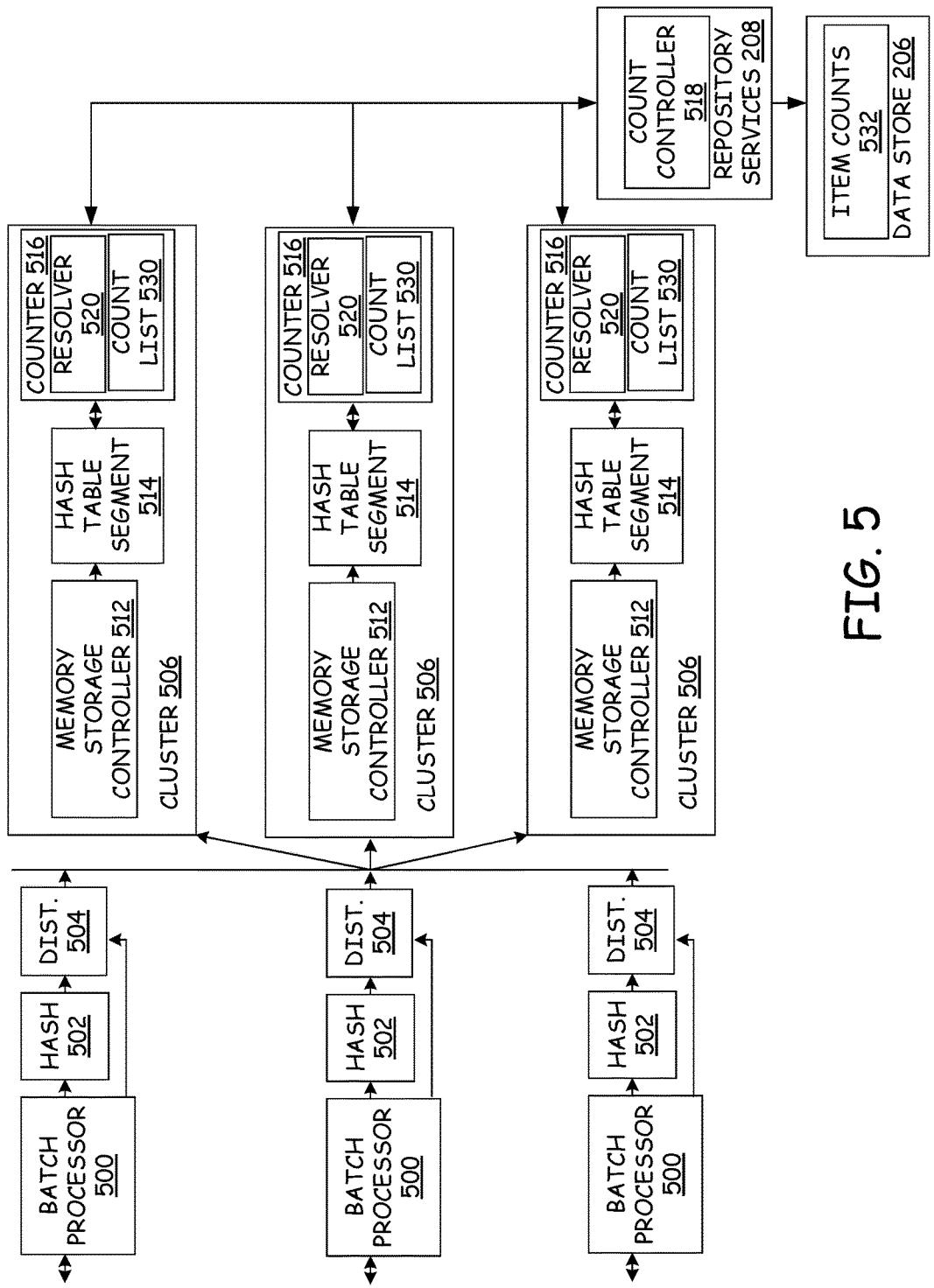
FIG. 5 is a block diagram of elements in computer cluster services used to store RFID values and to perform counts in accordance with one embodiment.

FIG. 5 provides a block diagram of compute services 222 in accordance with one embodiment. Compute services 222 include multiple instances of a batch processor 500 where each instance requests all messages stored on the message broker 221 since message broker 221 last sent messages to a batch processor 500. In accordance with one embodiment, each batch processor 500 acts independently of the other batch processors 500 and is implemented on a separate server.

Figure 4:
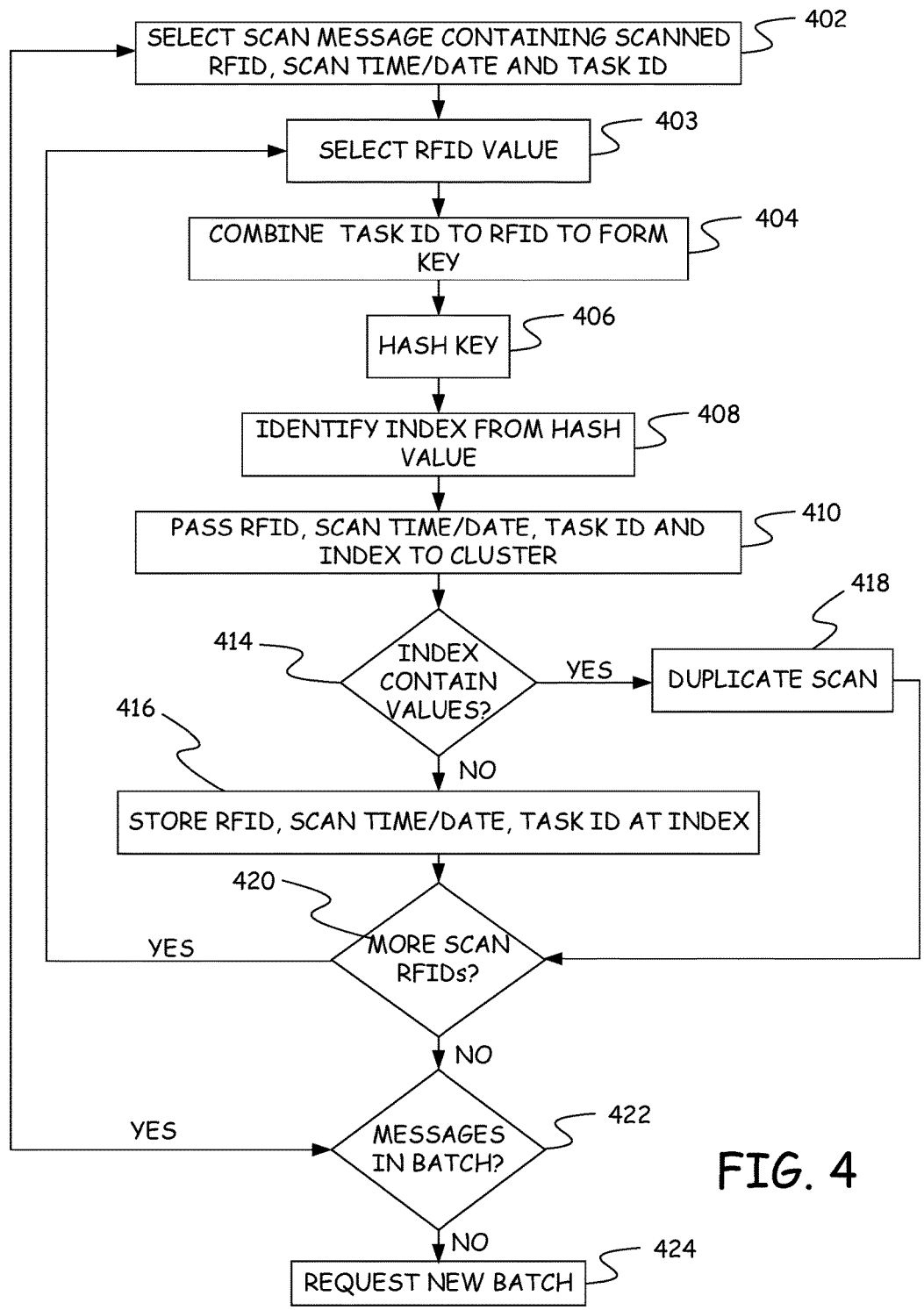
FIG. 4 is a flow diagram for storing RFID values.

FIG. 4 provides a flow diagram of a method performed by compute services 222 to store RFID values in a memory in an efficient manner so as to be able to detect duplicates. After receiving a batch of messages, the process of FIG. 4 begins at step 402 where batch processor 500 selects one of the scanned messages containing scanned RFIDs, a scan time and date, and a task ID. At step 403, batch processor 500 selects one of the RFID values. At step 404, batch process 500 combines the task ID with the RFID to form a key. In accordance with one embodiment, this combination involves appending the task ID to the RFID. At step 406, the key is provided to a hash module 502, which produces a hash value from the key by applying the key to a hash function. The hash function is selected to provide uniform distribution of hashed values for input keys. At step 408, hash module 502 identifies an index from the hash value, by for example, performing a module operation using the total number of available indices.

At step 410, a distribution unit 504 directs the RFID scan information including the RFID value, the task ID, the scan time and date, and the employee identifier, for example, to one of a plurality of computing clusters, such as computing clusters 506, 508 and 510 based on the identified index. In accordance with one embodiment, each computing cluster is responsible for a different hash table segment 514 of a common memory so that memory operations can be distributed across several servers. The division of the common memory across the different clusters is such that a single memory index can only be found in one of the hash table segments 514. In directing the RFID scan information to a cluster, distribution units 504 select the cluster that has responsibility for the identified index.

As a result of using this memory structure, all of the scans performed across multiple buildings of an enterprise, which in some embodiments can be thousands of buildings, are all stored in the same common memory. By storing all the scans in the same common memory, the process of performing inventory management counts is made more efficient since multiple different memories do not have to be maintained and accessed. In particular, a separate table or memory structure does not have to be generated for each scan or for each building/area. This reduces the amount of computational overhead required to access and process the RFID values received from the thousands of scanning tasks performed across the various buildings of the retail enterprise.

At step 414, a storage controller 512 in the assigned cluster determines if any values have been stored at the memory index determined from the combined RFID and task ID key. To do this, storage controller 512 examines the memory location in hash table segment 514 indicated by the memory index. The first time the RFID value is scanned, the memory location represented by the index will not contain a value and the RFID value, the scan time and date, the employee identifier and the task ID will be stored at the memory location at step 416. In accordance with one embodiment, when the RFID value, the scan time and date, the employee identifier and the task ID are stored, a timer is set for the memory location that will cause the values at the memory location to be deleted at a certain time and date in the future. In accordance with one embodiment, once a scan starts, the scanning task must be completed within a set and configurable period of time, such as 8 hours. In such embodiments, every memory location associated with a scanning task will expire and be deleted 8 hours after the scanning task has begun. Although 8 hours is mentioned above, the period for completing a scan can be set to any desired value.

If at step 414, a value is stored at the memory location, the current RFID value is considered to be the result of a duplicate scan at step 416. In this context, a duplicate scan is a scan of a same RFID value at different times during a same scanning task as represented by a particular scanning task ID. The RFID value can be scanned multiple times by the same device or by different devices that are all performing the same scanning task. Because the hash key is formed by the combination of the RFID value and the task ID, any scanning device that receives the same RFID value while performing the same scanning task will generate the same hash key at step 404 and therefore the same memory index at step 408.

In accordance with one embodiment, when a scan is considered a duplicate scan at step 416, the current values at the memory location are left unchanged and the storage controller 512 abstains from storing the scanning information associated with the latest scan of the RFID value, thereby discarding the scanning information associated with the latest scan. As a result, the scanning information for the first scan is maintained in the memory.

In other embodiments, instead of checking to see if an index contains values, the information for the current scan of the RFID value during a particular scanning task is simply written over the existing entry at the memory index. As a result, the memory still contains only a single entry for each combination of RFID value and scanning task identifier but each memory location contains the latest scanning information for the RFID value as part of the scanning task associated with the scanning task identifier.

After determining if the scan is a duplicate scan at step 418 or after storing the RFID value, the scan time and date, and the task ID at the memory index at step 416, storage controller 512 determines if there are more RFIDs in the current message. If there are more RFID values, the next RFID value is selected by returning to step 403 and steps 404-420 are repeated. Note that when repeating step 404, the same task identifier is used as was used for the previous RFID. When all of the RFID values in the current message have been processed at step 420, storage controller 512 determines if there are more scan messages in the batch at step 422. If there are more scan messages in the batch, the next scan message is selected by returning to step 402 and steps 402-422 are repeated. When there are no more scan messages in the batch at step 422, a new batch of scan messages is requested at step 424.

Note that because the RFID value is combined with the tag value to form the hash key at step 404, if the same RFID value is scanned during different scanning tasks due to movement of the product between store areas or stores in between when the two scanning tasks are performed, the same RFID value will receive separate memory index values for each scanning task. As a result, a separate entry is provided in memory for each scanning task that scans the same RFID tag. This allows the movement of products between scans to be tracked while preventing duplicate scans formed during the same scanning task from receiving their own entries in memory.

Figure 6:
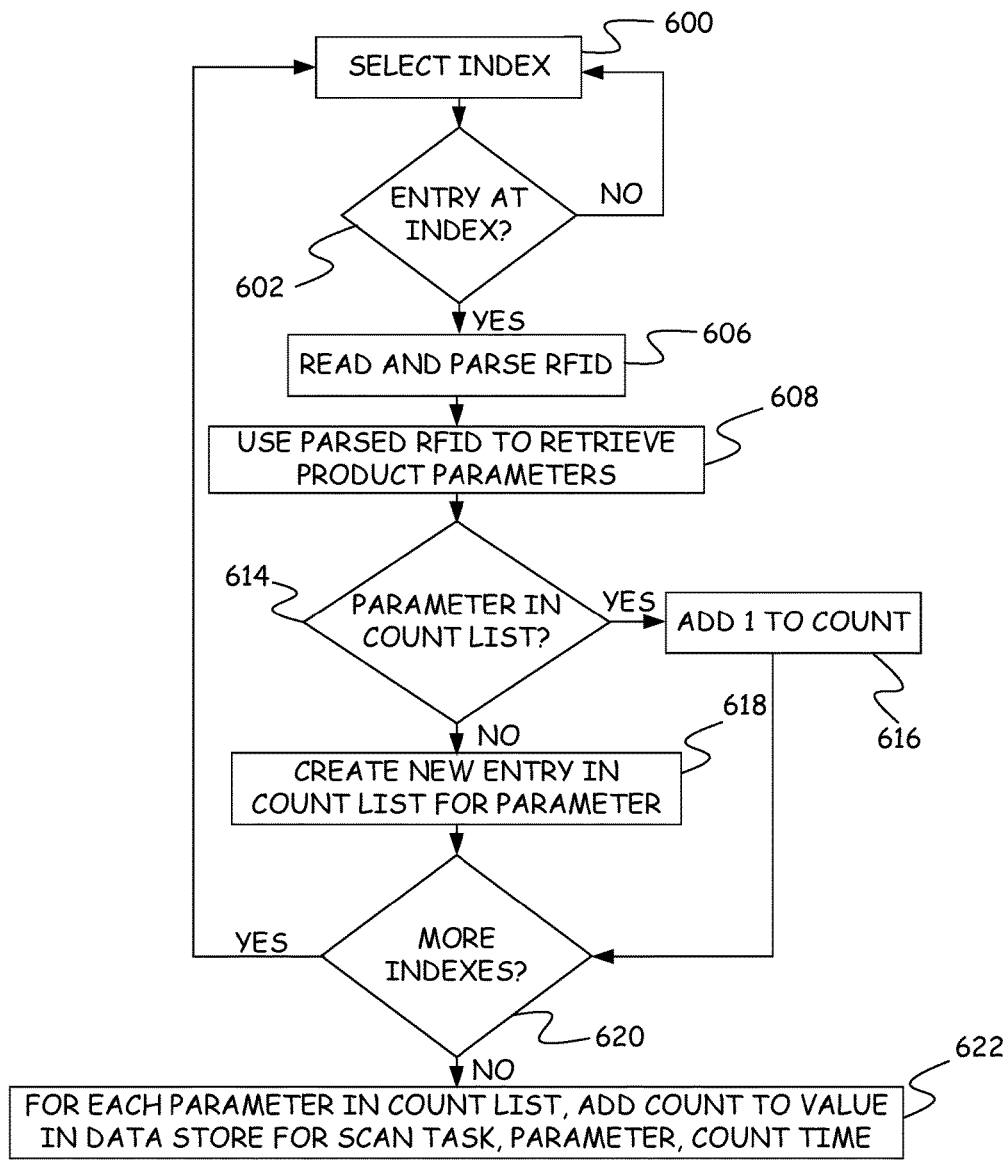
FIG. 6 is a flow diagram of a method of performing a count in accordance with one embodiment.

FIG. 6 provides a flow diagram of a method of counting products that have been scanned. The process of FIG. 6 is performed by a counter 516 on each cluster, such as cluster 506, 508 and 510, which are activated by a count controller 518 of repository services 208. In particular, counter controller 518 periodically calls each counter 516 to initiate a new count. With each new count, counter controller 518 assigns a count identifier and/or a count date and time to distinguish the current count from previous counts.

At step 600, counter 516 selects an index of the hash table segment 514 assigned to the respective cluster. At step 602, counter 516 determines if there is an entry at the index. If there is no entry at the index, counter 516 selects another index by returning to step 600. When there is an entry of the index, counter 516 invokes a resolver 520, which reads and parses the RFID value at step 606 and uses the parsed RFID to retrieve product parameters from data store 206 at step 608. In particular, data store 206 includes a separate entry for each RFID value and that entry includes product parameters, such as the name of the product, various levels of product classes that the product fits within, the quantity of subunits within the unit of the product, the size of the product unit, and other descriptors of the product. Such parameters can be organized from generic to specific, such as for example, grocery department→paper products→paper towels→Brand A paper towels→two pack→extra strength. Such parameters allow each product to be classified into various size groups to allow counting based on different parameters. For example, if a count is desired of all paper products, the paper products parameter can be used whereas if a count is desired for a particular brand of paper towels, the Brand A paper towel parameter can be used. In other embodiments, the only product parameter that is retrieved is a product identifier that can be used to access the other product parameters from data store 206.

After step 608, counter 516 determines if the product is in a count list 530 maintained by counter 516. Each product may be entered into count list 530 multiple time using different levels of product parameters. For example, a paper towel unit may appear in the count list as a paper product and separately as a Brand A paper towel. The particular level(s) of product parameters for which counts are being collected can be set by counter controller 518. For each parameter level designated by counter controller 518, counter 516 examines count list 530 to determine if the product parameter from the memory location is already in count list 530 at step 614. If the product parameter is already in count list 530, the count for that parameter is increased by one at step 616. If the parameter is not in count list 530 at step 614, a new entry for the parameter is added to count list 530 at step 618 with a count value of 1. After the count list has been updated, counter 516 determines if there are more indices in the hash table segment 514 to process at step 620. If there are more indices, the process returns to step 600 to select a new index and step 602 through 620 are repeated. When all the indices in the hash table segment 514 have been processed at step 620, item counts 532 in data store 206 are updated for each product parameter in count list 530 by adding the count for that product parameter to an existing count in item counts 532 for that product parameter. In accordance with one embodiment, a separate item count is maintained for each product parameter designated by counter controller 518 for each scanning task and each count time. Thus, for a single scanning task, there may be several counting events each having their own counting time stored in item count 532.

By storing different counts for different count times of the same scanning task, it is possible to track the progress of the scanning task. In particular, devices 210 can provide a status graphical user interface 132 of FIG. 1 that when selected sends a request to a status display API 250 together with the identifier for the scanning task. In response, status display API 250 requests the latest item counts 532 for the scanning task and returns those item counts to device 210. In accordance with one embodiment, the item counts are simply the total number of different product units that have been scanned during the scanning task. In other embodiments, the item counts can be broken down based on various product parameters. For example, a count can be provided of the number of Brand A paper towels that have been scanned.

In addition, item counts 532 may be accessed through inventory integration services 270 to provide an on-hand count 272. In particular, inventory integration services 270 are able to combine item counts from different scans to obtain total item counts in a building such as a store as well as total item counts across an entire retail enterprise. In addition, inventory integration services 270 can provide a time series of item counts showing changes in the number of units of various products and product classes over time.

In FIG. 5, a compute service 222 is formed by a combination of a batch processor 500, hash module 502, distribution unit 504, and cluster such as cluster 506, 508 and 510. Since different messages will be sent to different batch processors 500, different scan messages associated with the same scanning task or with different scanning tasks will be processed by different compute services 222.

Figure 7:
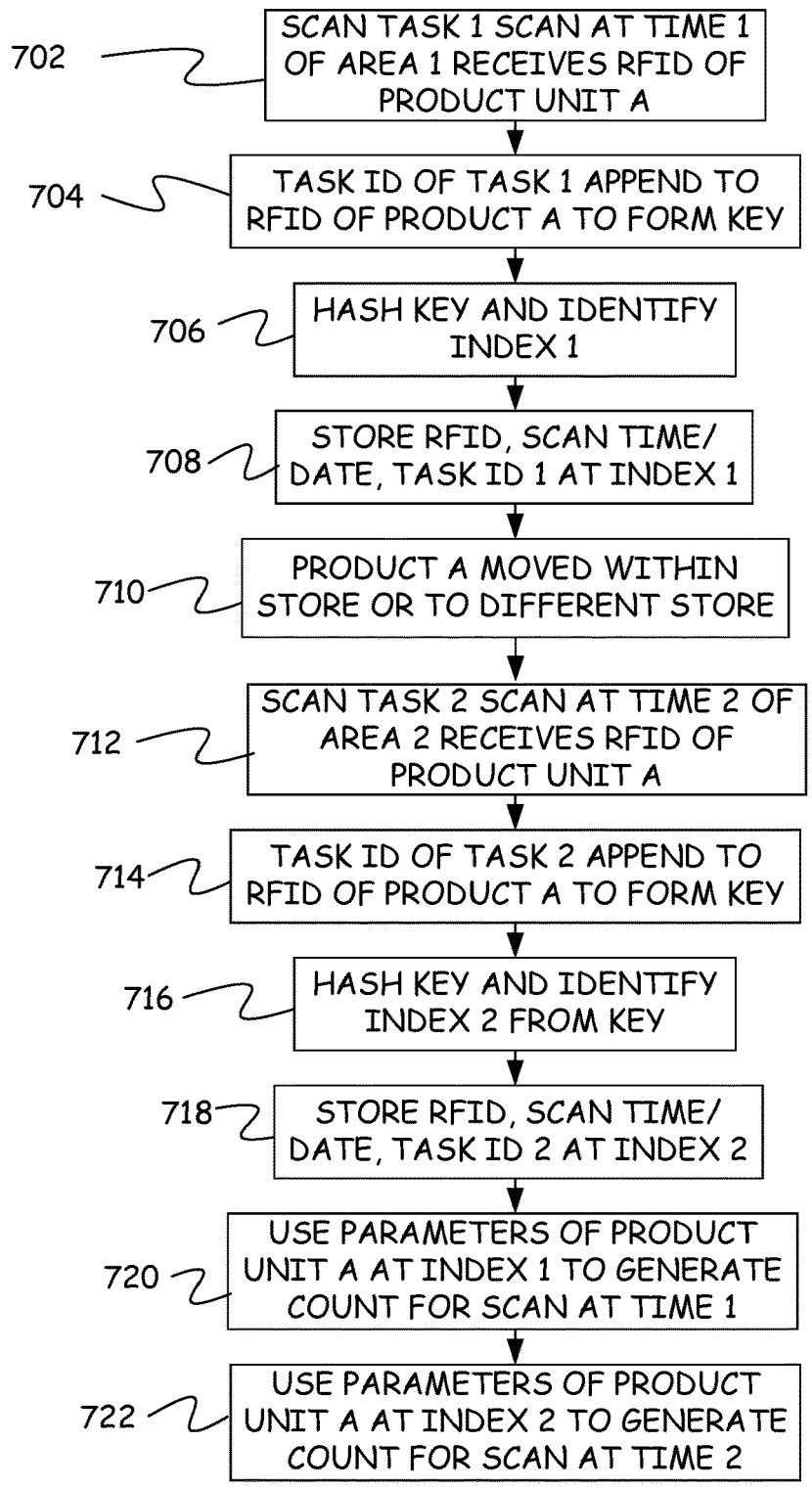
FIG. 7 is flow diagram of a method of scanning a same unit of a product in different locations.

FIG. 7 provides a flow diagram of one embodiment in which two different scanning tasks scan the same RFID of a product resulting in separate counts of the same product for two different scans. At step 702, scan task 1 of area 1 is performed at time 1 resulting in the reception of the RFID of product unit A. At step 704, the task ID of task 1 is appended to the RFID of product unit A to form the hash key as shown by step 404 of FIG. 4. At step 706, the key is hashed and is used to identify index 1 as shown by steps 406 and 408 of FIG. 4. At step 708, the RFID for product unit A, the scan time/date and the task ID for scan task 1 are stored at index 1 using step 416 of FIG. 4.

At step 710, product unit A is moved to a different area within the building or to a different building. At step 712, scan task 2 in area 2 is performed at time 2 resulting in the reception of the RFID of product unit A. Area 2 can be a different area within a building or a different building relative to area 1. At step 714, the task ID of task 2 is appended to the RFID of product unit A to form a key. This key is different from the key formed in step 704 because the task ID of scan task 2 is different from the task ID of scan task 1. At step 716, the new key is hashed to identify index 2 where index 2 is a different memory index from index 1 of step 706. At step 718, the RFID for product unit A, the scan time/date and the task ID for scan task 2 are stored at index 2 using step 416 of FIG. 4. At step 720, the parameters of product unit A at index 1 are used to generate a count for the scan at time 1 and at step 722, the parameters of product unit A at index 2 are used to generate a count for the scan at time 2. Note that the counts for the scan at time 1 and time 2 can be determined at the same time using counters 516. In other words, since counters 516 go through every index in the common memory formed of hash table segments 514 and the hash table segments contain product parameters for RFID values scanned during multiple different scanning tasks, the same product can be included in the count determined for two different scanning tasks during a single count operation. Note however, because the indices are formed from keys that include a combination of the RFID and the task ID of the scanning task, a single product will not be counted twice for the same scanning task.

Figure 8:
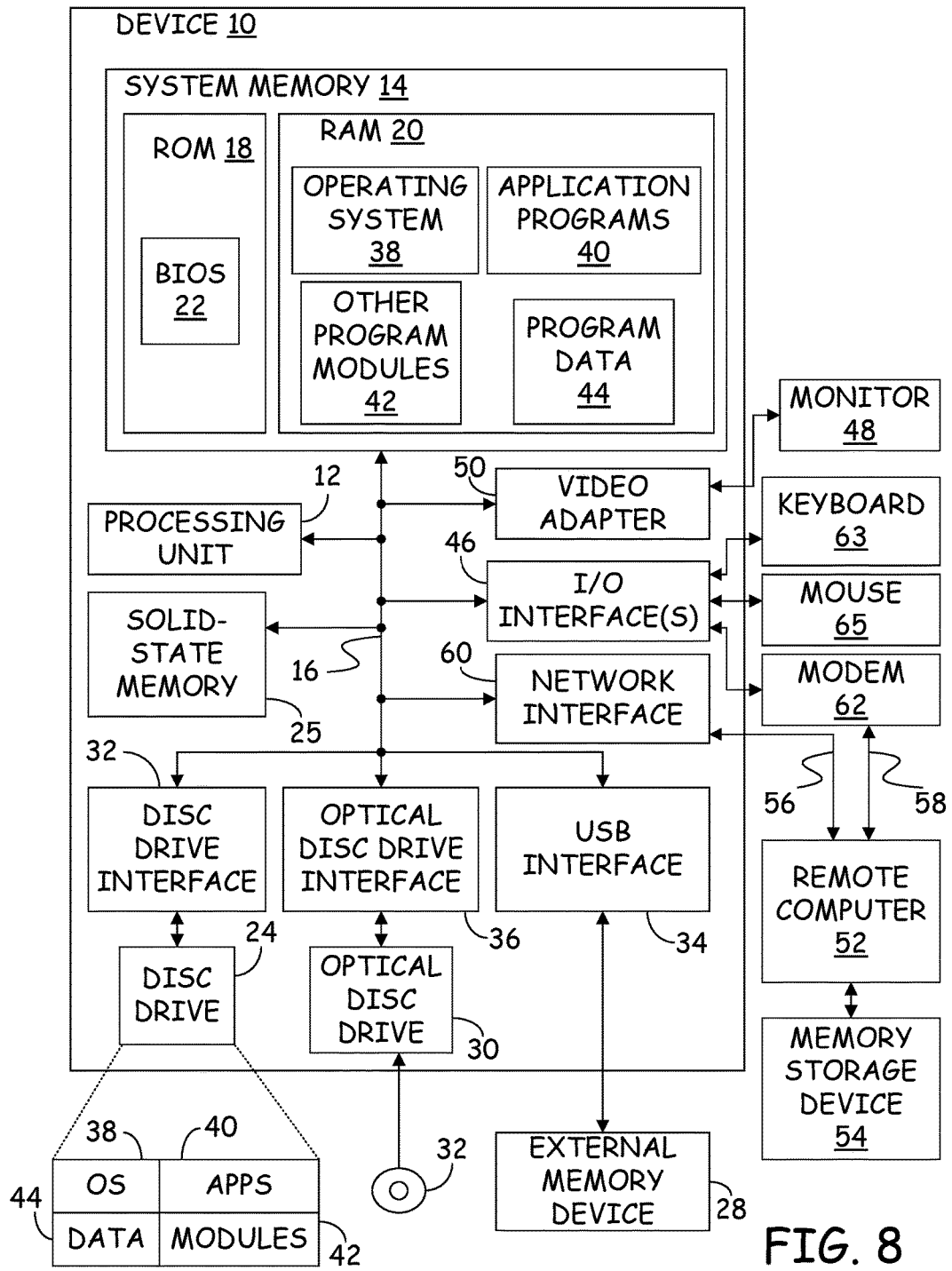
FIG. 8 is a block diagram of a computing device used to implement the various embodiments.

FIG. 8 provides an example of a computing device 10 that can be used as server 122 in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the services or modules discussed above. Program data 44 may include data stored in hash table segments 514 and data store 206, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 8. The network connections depicted in FIG. 8 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 8 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
receiving data comprising an RFID value transmitted by an RFID tag during a scanning task and an identifier for the scanning task;
combining the RFID value and the identifier for the scanning task to form a key;
applying the key to a hashing function to generate a memory index; and
storing the received data at a memory location indicated by the memory index.

2. The computer-implemented method of claim 1 wherein receiving data comprises receiving data from separate scanning tasks in an interleaved manner over a period of time.

3. The computer-implemented method of claim 1 further comprising:
receiving second data comprising the RFID value transmitted by the RFID tag during the scanning task and the identifier for the scanning task;
combining the RFID value and the identifier for the scanning task to form the key;
applying the key to a hashing function to generate the memory index;
determining that the received data is already stored at the memory location indicated by the memory index; and
in response to the determination that the received data is already stored, discarding the second data.

4. The computer-implemented method of claim 3 further comprising:
receiving third data comprising the RFID value transmitted by the RFID tag during a second scanning task and an identifier for the second scanning task;
combining the RFID value and the identifier for the second scanning task to form a second key;
applying the second key to a hashing function to generate a second memory index; and storing the received data at a memory location indicated by the second memory index.

5. The computer-implemented method of claim 4 wherein the scanning task takes place in a first area of a store and the second scanning task takes place in a second area of the store that is different from the first area.

6. The computer-implemented method of claim 4 wherein the scanning task takes place in a first store and the second scanning task takes place in a second store.

7. The computer-implemented method of claim 1 further comprising:
receiving second data comprising the RFID value transmitted by the RFID tag during a second scanning task and an identifier for the second scanning task;
combining the RFID value and the identifier for the second scanning task to form a second key;
applying the second key to the hashing function to generate a second memory index; and
storing the received data at a memory location indicated by the second memory index.

8. A system comprising:
a plurality of scanning devices providing a plurality of RFID values during a plurality of scanning tasks; and
a plurality of compute services implemented on a plurality of servers, each compute service receiving an RFID value from the plurality of RFID values and an identifier for a scanning task that produced the RFID value, combining the RFID value and the identifier for the scanning task to form a key, hashing the key to form a memory index for a common memory used for all scanning tasks, and storing the RFID value in the common memory at a location indicated by the memory index.

9. The system of claim 8 further comprising:
count services that access locations of the common memory that contain RFID values to generate count values for product parameters represented by the RFID values.

10. The system of claim 9 wherein the count services store a count value for a product parameter together with the identifier for the scanning task such that a scanning device can request the count value using the identifier for the scanning task.

11. The system of claim 8 wherein the plurality of scanning tasks comprise two scanning tasks having two different identifiers that are performed in a same store.

12. The system of claim 11 wherein a first scanning device performs a first of the two scanning tasks and provides a first RFID value and an identifier for the first of the two scanning tasks and wherein a second scanning device performs a second of the two scanning tasks and provides the first RFID value and an identifier for the second of the two scanning tasks.

13. The system of claim 12 wherein a first compute service stores the first RFID value in a location indicated by a first memory index and a second compute service stores the first RFID value in a location indicated by a second memory index different from the first memory index.

14. The system of claim 8 wherein:
a first scanning device provides a first RFID value and a first identifier for a first scanning task;
a second scanning device provides the first RFID value and the first identifier for the first scanning task;
a first compute service:
receives the first RFID value and the first identifier for the first scanning task provided by the first scanning device;
combines the RFID value and the identifier for the scanning task to form a key;
hashes the key to form a memory index for the common memory; and
stores the RFID value in the common memory at a location indicated by the memory index; and
a second compute service:
receives the first RFID value and the first identifier for the first scanning task provided by the second scanning device;
combines the RFID value and the identifier for the scanning task to form the key;
hashes the key to form the memory index for the common memory;
determines that the RFID value has been stored at the location indicated by the memory index; and
in response to the determination, abstains from writing to the location indicated by the memory index.

15. The system of claim 8 wherein the plurality of scanning devices are distributed across a plurality of buildings.

16. A method comprising:
providing a plurality of RFID values during a plurality of scanning tasks; and
receiving an RFID value from the plurality of RFID values and an identifier for a scanning task that produced the RFID value, combining the RFID value and the identifier for the scanning task to form a key, hashing the key to form a memory index for a common memory used for all scanning tasks, and storing the RFID value in the common memory at a location indicated by the memory index.

17. The method of claim 16 further comprising:
accessing locations of the common memory that contain RFID values to generate count values for product parameters represented by the RFID values.

18. The method of claim 17 further comprising storing a count value for a product parameter together with the identifier for the scanning task such that a scanning device can request the count value using the identifier for the scanning task.

19. The method of claim 16 wherein the plurality of scanning tasks comprise two scanning tasks having two different identifiers that are performed in a same building.

20. The method of claim 19 wherein a first scanning device performs a first of the two scanning tasks and provides a first RFID value and an identifier for the first of the two scanning tasks and wherein a second scanning device performs a second of the two scanning tasks and provides the first RFID value and an identifier for the second of the two scanning tasks.

* * * * *